(12) United States Patent
Hellot et al.

(10) Patent No.: US 10,942,983 B2
(45) Date of Patent: Mar. 9, 2021

(54) INTERACTIVE WEB DEVICE WITH CUSTOMIZABLE DISPLAY

(71) Applicant: F4, Paris (FR)

(72) Inventors: Gauthier Hellot, Paris (FR); Charly Koza, Ezanville (FR); Cécile Giorla, Paris (FR); Alexis Galley, Viroflay (FR); Jean-Marc Oury, Paris (FR); Bruno Heintz, Paris (FR)

(73) Assignee: F4, Paris (FR)

( * ) Notice: Subject to any disclaimer, the term of this patent is extended or adjusted under 35 U.S.C. 154(b) by 37 days.

(21) Appl. No.: 15/767,202

(22) PCT Filed: Oct. 10, 2016

(86) PCT No.: PCT/FR2016/052616
§ 371 (c)(1),
(2) Date: Apr. 10, 2018

(87) PCT Pub. No.: WO2017/064405
PCT Pub. Date: Apr. 20, 2017

(65) Prior Publication Data
US 2019/0073431 A1    Mar. 7, 2019

(30) Foreign Application Priority Data
Oct. 16, 2015   (FR) ...................... 1559877

(51) Int. Cl.
*G06F 17/20*   (2006.01)
*G06F 16/957*  (2019.01)
(Continued)

(52) U.S. Cl.
CPC ............. *G06F 16/957* (2019.01); *G06F 8/20* (2013.01); *G06F 9/445* (2013.01); *G06F 16/9535* (2019.01)

(58) Field of Classification Search
CPC .......... G06F 16/957; G06F 8/20; G06F 9/445; G06F 16/9535
See application file for complete search history.

(56) References Cited

U.S. PATENT DOCUMENTS 6,046,747 A *   4/2000   Saunders ................ G06T 15/10
                                                    345/522
6,885,367 B1    4/2005   Fujieda
(Continued)

FOREIGN PATENT DOCUMENTS

CA     2320721 A1    3/2002
EP     1453011 A1    9/2004
(Continued)

OTHER PUBLICATIONS

Limberger et al., Interactive Software Maps for Web-Based Source Code Analysis, Web3D 2013 (Jun. 20-22, 2013) (Year: 2013).*
(Continued)

*Primary Examiner* — Shahid K Khan
(74) *Attorney, Agent, or Firm* — McCarter & English, LLP

(57) ABSTRACT

An interactive device comprises a user interface arranged to define at least one display request comprising at least location data and display data, a network interface arranged to transmit a request for web page data corresponding to a display request, and a memory for receiving corresponding web page data and customisation data, the web page data comprising map data and/or object data. A web interpreter is arranged to allow the display of a web page and comprising a 3D engine arranged to calculate three-dimensional display data. The web interpreter also comprises a manager operating by an execution cycle and arranged to determine a list comprising at least one operation which can be a request for
(Continued)

US 10,942,983 B2

Page 2 object data and/or map data or the processing of received data by the 3D engine or the display engine.

6 Claims, 1 Drawing Sheet

(51) Int. Cl.
*G06F 8/20* (2018.01)
*G06F 9/445* (2018.01)
*G06F 16/9535* (2019.01)

(56) References Cited

U.S. PATENT DOCUMENTS

| | | | |
|---|---|---|---|
| 7,570,261 | B1 | 8/2009 | Edecker et al. |
| 8,941,642 | B2 | 1/2015 | Tadaishi et al. |
| 9,720,555 | B2 | 8/2017 | Sorden et al. |
| 2005/0270311 | A1* | 12/2005 | Rasmussen ............ G01C 21/32 345/677 |
| 2006/0170693 | A1 | 8/2006 | Bethune et al. |
| 2007/0070066 | A1 | 3/2007 | Bakhash |
| 2008/0109159 | A1 | 5/2008 | Shi et al. |
| 2008/0306709 | A1 | 12/2008 | Fisker et al. |
| 2010/0284594 | A1 | 11/2010 | Hohne et al. |
| 2011/0072369 | A1 | 3/2011 | Choi et al. |
| 2011/0161843 | A1 | 6/2011 | Bennett et al. |
| 2012/0271848 | A1 | 10/2012 | Kadowaki et al. |
| 2013/0007575 | A1* | 1/2013 | Bacus .................. G06F 16/957 715/202 |
| 2013/0024764 | A1 | 1/2013 | Lou et al. |
| 2013/0044260 | A1 | 2/2013 | Vestergaard et al. |
| 2013/0076784 | A1* | 3/2013 | Maurer ................. G01C 21/36 345/629 |
| 2013/0091452 | A1 | 4/2013 | Sorden et al. |
| 2013/0132466 | A1* | 5/2013 | Miller .................. G06F 16/972 709/203 |
| 2013/0155053 | A1 | 6/2013 | Beck et al. |
| 2013/0241926 | A1 | 9/2013 | Asaria et al. |
| 2013/0321400 | A1* | 12/2013 | van Os ................. G01C 21/26 345/419 |
| 2014/0071119 | A1 | 3/2014 | Piemonte et al. |
| 2014/0157315 | A1 | 6/2014 | He et al. |
| 2015/0082181 | A1 | 3/2015 | Ames et al. |
| 2015/0091906 | A1 | 4/2015 | Dishno |
| 2015/0135114 | A1* | 5/2015 | Zhang ................ G06F 16/9535 715/771 |
| 2015/0161823 | A1 | 6/2015 | Anderson-Sprecher et al. |
| 2015/0170397 | A1 | 6/2015 | Han et al. |
| 2015/0220244 | A1 | 8/2015 | Vats et al. |
| 2018/0217863 | A1 | 8/2018 | Bernard et al. |
| 2018/0322143 | A1 | 11/2018 | Bernard et al. |

FOREIGN PATENT DOCUMENTS

| | | |
|---|---|---|
| EP | 1657682 A2 | 5/2006 |
| EP | 2595118 A2 | 5/2013 |
| EP | 2780826 A1 | 9/2014 |
| WO | 01/59540 A2 | 8/2001 |
| WO | 01/84501 A2 | 11/2001 |

OTHER PUBLICATIONS

International Search Report of the International Searching Authority, along with its English translation, dated Sep. 5, 2016, issued in connection with International Application No. PCT/FR2016/051532 (7 pages).
Written Opinion of the International Searching Authority dated Sep. 5, 2016, issued in connection with International Application No. PCT/FR2016/051532 (7 pages).
International Search Report of the International Searching Authority, along with its English translation, dated Oct. 6, 2016, issued in connection with International Application No. PCT/FR2016/051732 (5 pages).
Written Opinion of the International Searching Authority dated Oct. 6, 2016, issued in connection with International Application No. PCT/FR2016/051732 (6 pages).
International Search Report of the International Searching Authority, along with its English translation, dated Dec. 14, 2016, issued in connection with International Application No. PCT/FR2016/052616 (8 pages).
Written Opinion of the International Searching Authority, dated Dec. 14, 2016, issued in connection with International Application No. PCT/FR2016/052616 (6 pages).
Limberger, et al., "Interactive Software Maps for Web-Based Source Code Analysis," Web3D 2013, Jun. 20-22, 2013 (8 pages).
Office Action dated Mar. 29, 2019, issued in connection with U.S. Appl. No. 15/739,479 (10 pages).
Office Action dated Jul. 3, 2019, issued in connection with U.S. Appl. No. 15/744,442 (17 pages).
Office Action dated Feb. 11, 2020, issued in connection with U.S. Appl. No. 15/744,442 (19 pages).
Applicant-Initiated Interview Summary dated Aug. 18, 2020, issued in connection with U.S. Appl. No. 15/744,442 (3 pages).
Office Action dated Sep. 28, 2020, issued in connection with U.S. Appl. No. 15/744,442 (17 pages).
Applicant-Initiated Interview Summary dated Oct. 1, 2020, issued in connection with U.S. Appl. No. 15/744,442 (2 pages).
Wikipedia entry for "Interpreter (computing)," archived at web.archive.org/web/20150707173159/https://en.wikipedia.org/wiki/Interpreter_(computing), Jul. 7, 2015 (7 pages).

* cited by examiner

US 10,942,983 B2

INTERACTIVE WEB DEVICE WITH CUSTOMIZABLE DISPLAY

RELATED APPLICATIONS

This application is a U.S. National Phase Application under 35 U.S.C. 371 of International Application No. PCT/FR2016/052616 filed Oct. 10 2016, which claims the benefit of French Patent Application No. 1559877 filed on Oct. 16, 2015. The disclosures of these applications are incorporated herein by reference in their entireties.

BACKGROUND

The invention relates to the field of web devices, and in particular that of devices allowing interaction. More particularly, the invention relates to the field of internet mapping.

For a long time, internet mapping has been limited to the reproduction of paper maps in the form of images. This was imprecise and highly bandwidth intensive, and gave rise to problems of relevance, because the images offered no simple means of scaling or customization.

Major actors in new technology have modified this situation by proposing internet maps that were lighter, with adaptive scaling, and allowed the user to rapidly scan a given map. It should be noted that these solutions, like the invention, are all of the "pure web" type; that is to say, a web client (a browser or a smartphone application) interacts with a server to obtain the data, but does not store anything locally, apart from the cache. All the data originate from the server, in real time except for the data in the cache. This is crucial, because, in view of the currently available bandwidth, there are very severe constraints on what can be obtained in terms of visual effects if a fluid display is to be maintained.

The same actors have added information layers to these maps, in order to add some information, such as the location of certain businesses, monuments, or the like. However, these are literally layers, in the graphic sense of the term: the nature of the interaction is limited to the display of a text, the clickable area allowing this interaction is limited to a small, arbitrarily chosen area, and cannot, for example, relate to a whole building, or to a park in a city. Efforts have also been made to provide a degree of realism by adding three-dimensional views for some buildings. Here again, though, these are purely graphic elements, without any interaction. In all cases, customization is minimal or non-existent.

In response to these problems, the applicant has developed a device and a method described in patent applications FR 1555807 and FR 1556682. This type of device, like others where intensive use is made of web resources (which is often the case where 3D is provided), is highly demanding in terms of resources, and the optimization of the user experience is difficult if it is to be used to the maximum.

SUMMARY

The invention is intended to improve the situation. For this purpose, the invention proposes an interactive device comprising a user interface arranged to define at least one display request comprising at least localization data and display data, a network interface arranged for sending a web page data request in correspondence with a display request, and a memory for receiving corresponding web page data and customization data, the web page data comprising mapping data and/or object data.

The device further comprises a web interpreter arranged for displaying a web page and comprising a 3D engine arranged for calculating three-dimensional display data on the basis of object data, and a display engine arranged for enabling web page data to be displayed on the basis of mapping data and/or three-dimensional display data.

The web interpreter further comprises a manager operating by execution cycle and arranged for determining a list comprising at least one operation that may be a request for object data and/or mapping data, or processing by the 3D engine or the engine for displaying received data, the manager modifying certain operations on the execution list on the basis of the customization data defined by the user interface.

This device is particularly advantageous because it enables interactive display, customizable in real time, to be implemented by using a potentially large amount of objects, even on less powerful devices.

According to some variants, the device may have one or more of the following characteristics:
- the manager modifies certain processing operations by the 3D engine on the execution list by modifying the downloaded object data on the basis of the customization data,
- the modification of the object data comprises one operation from among the group comprising the modification of the height data, the modification of the color and/or texture transparency data, the modification of the data defining the shape of the object and the fusion with other object data,
- the manager modifies certain object data request operations or processing operations by the 3D engine on the execution list by removing them on the basis of the customization data,
- the manager is arranged for executing the operations according to their order in the list,
- the manager attempts to execute the data request operations before the processing operations, and
- the manager determines, between the execution of two operations, whether a time interval between the current time and the time of the next execution cycle is greater than a threshold time value, and ceases to move down the list of operations if necessary.

The invention also relates to a computer program product comprising portions of program code for implementing the interactive device when said program is executed on a computer.

BRIEF DESCRIPTION OF THE DRAWINGS

Other characteristics and advantages of the invention will be more apparent from a perusal of the following description, drawn from non-limiting examples provided for illustrative purposes, drawn from the drawings in which.

The drawings and description below essentially contain elements of a defined nature. Consequently they can be used not only to clarify the understanding of the present invention but also to contribute to the definition of the invention when appropriate.

DETAILED DESCRIPTION

The present description is such that it includes elements subject to protection by the law on authors' rights and/or copyright. The holder of the rights has no objection to the identical reproduction by any person of the present patent document or its description as it appears in official files. Regarding other elements, he reserves all his rights.

Figure 1:
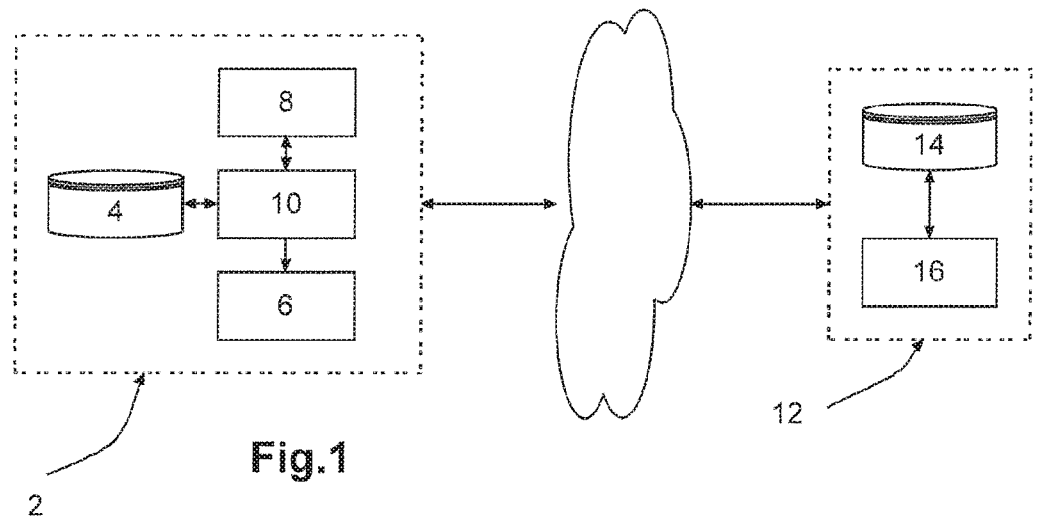
FIG. 1 shows a schematic diagram of a device according to the invention in its operating environment.

FIG. 1 shows a schematic diagram of an interactive device 2 according to the invention in its environment.

The example described here is applicable in a particularly useful way to the field of online mapping. However, the invention is applicable to any situation requiring a three-dimensional display which requires interactivity with the user in an "all-server" or "all streaming" context, that is to say one in which all the data originate from a server, the device storing nothing locally (including the JavaScript code of the 3D engine in the example described here) except for the cache. This application is particularly suitable for web use, but may be used as a smartphone application for example, in a format other than a web page. In this case, the application may store the code data of the 3D engine for example, but will not always be intended to store data other than those of the cache; that is to say, the stored data are not persistent.

The device 2 comprises a memory 4, a display 6, a user interface 8, a network interface (not shown) and a web interpreter 10.

The memory 4 may be any means of storing information, such as flash memory, RAM memory, a hard disk, a connection to a remote or cloud storage system, or the like. In the context of the invention, the memory 4 is used to store the data for the purpose of processing. As mentioned above, the data in the memory 4 are not intended to be persistent, except by being used as a cache whose validity time is programmed and limited. This is because the invention is intended for a real-time application in which all the data are obtained from the server, without preliminary local storage.

The display 6 may be any conventional display such as a screen, video projector, projection glasses, or the like. The user interface 8 enables the user of the device 2 to choose the display parameters of the map as well as the location that he wishes to display.

The display parameters may concern, in a non-restrictive way, the latitude and longitude, the zoom level, the angle of view, and the orientation. These parameters are conventional in this type of application. The invention also proposes other display parameters, or customization data, which are described below. The customization data may be defined by the user interface in an explicit manner, by the choice of options, or implicit, by the application of customization data associated with a specific request, or alternatively in the manner of a template.

In fact, in the known applications, it is possible to activate or disable the display of certain elements. However, this is only a matter of displaying or not displaying the corresponding information layers. It is not a matter of allowing the customization of the display of a restricted set of objects, for example. Moreover, we cannot speak of "objects" in relation to the prior art applications. They are concerned with simple maps, which may be provided with three-dimensional displays, but cannot be individualized. Conversely, the invention enables each element of the map to be made independent, in the form of a computer object.

The web interpreter 10 may be implemented by any browser using HTML, JavaScript and WebGL. As will be apparent from the following description, the web interpreter 10 comprises a 3D engine, a display engine, a WebGL interpreter and a manager (not shown). In the example described here, the user accesses the map via a web page. This web page contains HTML code, JavaScript code and WebGL code simultaneously. The JavaScript code defines the 3D engine, which receives object data to be represented on the map portion required by the user, and converts these object data into face data. The face data are transmitted to the WebGL interpreter, which interacts with the hardware resources of the device 2 to calculate the actual data to be displayed. The actual display is managed by the display engine of the web interpreter, on the basis of the mapping data received and the three-dimensional display data calculated, as described below. The manager is responsible for ordering the set of operations, as described with reference to FIG. 3.

Although the web interpreter 10 uses WebGL in the example described for rendering the object in three dimensions, the WebGL web interpreter is optional, and may be replaced by any other appropriate technology. As a general rule, it should be understood that the 3D engine controls the necessary actions in coordination with the manager in order to calculate the three-dimensional display data, the display engine being concerned solely with the display.

As mentioned above, all the data are obtained from a server 12 comprising a memory 14 and an engine 16. The memory 14 is similar to the memory 4, except in that it stores all the information required for the operation of the device 2 (unlike the memory 4, which almost exclusively stores the cache contents).

The engine 16 is an element that receives the web page data requests from the device 2. As described above, the device 2, on the basis of the data received by the user interface 8, defines a map display request on the basis of the localization data and the display data. These data jointly define a geographic area. On the basis of this geographic area, the device 2 sends a web page data request to the server 12, and the engine 16 selects the mapping data, together with the data of the objects corresponding to this request, from the memory 14.

In the example described here, the mapping data in the memory 14 are stored in the form of tiles at a number of levels of detail. Thus each tile is split into four sub-tiles when the zoom level increases, and vice versa, etc. In the example described here, the mapping data contain, for each tile, the list of objects associated with it. In a variant, the object data could contain data indicating the tiles to which they are attached.

In the example described here, the identification of the tiles is implicit; that is to say, the device 2 may determine which are the tile data to be requested from the server 12 via the web page data request. The latter is thus purely a request for resources, and the server 12 does not develop any "intelligence". In a variant, the web page data request could be more abstract and contain the localization data and the display data, and the server 12 would be responsible for determining the relevant tile data, by means of the engine 16.

In the example described here, the object data comprise data enabling the three-dimensional display of these objects to be defined in an abstract manner Thus, for a building, the object data comprise data defining the footprint on the ground, the shape of its roof, and building height data. The same building may have a number of heights. Thus, when the 3D engine calculates the face data of a building, it proceeds by "elevating" a contour corresponding to the footprint of the building on the ground at the height of the corresponding object data, and calculating the triangles defining each face of the object thus defined. Another way of looking at this is to consider the building as being "extruded" through its footprint on the ground to its heights. For ground or relief, the procedure is similar: a ground mesh is constructed by triangulation, based on the mapping data tiles. This mesh may be used to represent relief by means of object data of the relief data type, comprising localization data for indicating the tile to which they correspond, and altitude data for indicating the height of the relief. When the relief data are received, the vertices of the triangles of the tiles corresponding to the corresponding localization data are elevated to the height specified by the corresponding altitude data. The objects may also be immaterial, indicating, for example, a bus or light rail route, or a water or electricity distribution network, etc. Additionally, as described below, the way of generating the objects may vary according to the customization data.

Advantageously, but optionally, on the basis of the web page data request, the engine 16 may select the object data according to a value indicating their size. Thus, if the zoom is very distant, the engine 16 returns only the details whose size is relevant when the resolution of the reproduced map is taken into account. And as soon as a user zooms, the engine 16 sends the object data whose size has made them relevant, when the desired resolution or customization data are taken into account. This has the advantage of making it possible to control the downloading and processing load at the device end, while also improving the visual experience: as a user zooms, the world becomes more detailed as he watches.

Figure 2:
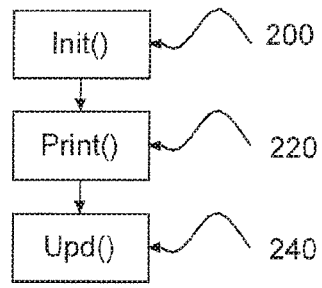
FIG. 2 shows a schematic diagram of an operating loop of the device of FIG. 1.

FIG. 2 shows a schematic diagram of an operating loop of the device of FIG. 1.

In an operation 200, the device 2 carries out the initialization of the map display. For this purpose, the localization data and the display parameters are obtained from the user interface 8, and the device 2 implements the network interface to send a display request to the server 12 with these data. In response, the server 12 sends data comprising the code of the 3D engine, together with the mapping data and the corresponding object data. In the following exchanges, the code of the 3D engine is no longer transmitted, except in case of any updates.

In an operation 220, the device 2 receives the mapping data and the object data, together with the code of the 3D engine. On the basis of these data, the web interpreter 10 prioritizes the display of the mapping data, for example, giving the user a quick view of the "map background". At the same time, the 3D engine processes the object data to calculate the corresponding face data according to the customization data. The face data of each object are grouped together and entered into a face data block, using a memory block of Float32Array type used by the WebGL interface, referred to hereafter as a Buffer32. The Buffer32 is a conventional tool used in WebGL which serves to transmit a 3D display data calculation request to a hardware resource on the basis of face data defined in the Buffer32. The WebGL interpreter transmits the Buffer32 containing all the face data to the hardware resource of the device 2 for calculating the data for the three-dimensional display of the object data. Each Buffer32 may contain data relating to 65536 triangle vertices. When a Buffer32 is "full", the 3D engine instantiates another, while saving the correspondences between the data of each Buffer32 and the objects to which they correspond. In a variant, the Buffer32 could be formed with another type of table of values. The face data may comprise data that define vertices, faces, or texture mapping information on the triangles.

Simultaneously, the web interpreter 10 saves a correspondence between the face data grouped for each object of the Buffer32, modified if necessary on the basis of the customization data, and the identifiers of the corresponding objects.

Thus, if a user wishes to select an object, he clicks with the mouse on a location of the object on the screen (or uses another means of selecting a location on the screen, such as the JavaScript "onMouseOver" event). In response, the WebGL interpreter sends a request of ray picking type, which returns the face in the Buffer32 that has been selected by the click, and, on the basis of this correspondence, the web interpreter 10 is capable of knowing which object has been clicked or selected, and can offer the user a menu of options for implementing requests specific to this object or to a class of objects corresponding to it in the server 12, or can display this object in a particular way. In a variant, methods other than ray picking could be used to determine the face located under the mouse (for example, rendering at a single point of the scene, with coloring of the faces according to their identifier, and identification of the face on the basis of the color of this point). The customization data and the resulting processing produce a specific correspondence between the face data grouped for each object of the Buffer32 and the identifiers of the corresponding objects, so that all the displayed objects continue to be selectable, whether or not they have been subjected to customization.

This characteristic is fundamental, for two reasons:
the concatenation of a considerable set of face data in a number of Buffer32s enables many objects to be displayed without loss of fluidity, and
by maintaining the correspondence between the objects and the face data corresponding to them in the face data block, the objects may be made truly interactive.

Previously, the so-called "objects" were single points, or non-clickable three-dimensional images. In the case of points, it was difficult to click on these, and the clickable area had no relation to the object concerned. Moreover, due to the associated "superimposed data layer" approach, the aim was not to make the objects interactive, but to add a simplistic information layer.

By contrast, the invention makes it possible to produce a novel type of customizable map in which interaction is possible and intuitive: if information is required on a light rail route or a building, or on plants growing on a street, it is simply necessary to click anywhere on the corresponding object, even if it has been custom-made as a result of customization. This customization may also be carried out in real time, object by object, and virtually instantaneously, since it is performed within the web interpreter, without using the data servers.

In existing maps, most of the details were omitted simply because they represented a body of information that could not be processed as a whole without excessively retarding the downloading and/or display. Because of the change to an "object" context, the details are themselves objects. It is therefore possible to choose the priority of display of the objects, with the most precise details, or the "less useful" ones, possibly being displayed last, or not being displayed at all, or being displayed in a simpler way, notably according to the customization data.

Additionally, the fact that the map is converted from a collection of juxtaposed map background tiles to a world composed of individual objects generates a resulting number of new applications that were previously inconceivable. For example, it becomes possible to implement real estate or geolocation applications which supply fast and relevant information. In the latter case, it may be imagined that clicking on a hospital will reveal the specialties practiced there, or that clicking on a particular building will indicate the particular care offered and/or the rooms for the services in question, or that clicking on a particular bench will indicate that it has been vandalized, etc. The other surrounding details may be given lower priority, in order to preserve the user experience while prioritizing the supply of the information that concerns the user (customization). It therefore becomes possible to introduce very many "information layers" into maps in a simple way, where this would previously have been impossible or inconvenient because of the use of superimposed "layers" not directly related to individualized objects, and to produce, in real time, maps that are entirely customized according to the user and time of use.

Finally, in an operation 240, the device 2 updates the display 6 on the basis of the user inputs via the user interface 8. Thus, if the user changes the zoom level, shifts the map or interacts with one of the objects, the web interpreter 10 calls the server 12 to obtain new data and calculates the data that are modified as a result.

The operations 220 and 240 are carried out while taking into account generic or user-specified customization data. In fact, the device of the invention enables display customization criteria to be defined.

These criteria may be used to make the display of the invention compatible with less powerful devices, by reducing the number of objects to be displayed, or, conversely, to enrich the reproduction quality further with more powerful devices.

Thus, in an application of the localization type, the user may see the map being customized for him according to the searches he makes.

For example, if he searches for a theatre, the whole of the building containing the theatre will be highlighted, by being displayed in red for example, in place of the conventional marker above the building. It will also be possible to highlight the open restaurants around the theatre. Depending on whether the user has a car or prefers public transport or cycling, the parking places around the theatre, the routes and stops, or the cycle tracks may be highlighted.

In a variant, the customization may be a modification during the processing of the object data, by:
  changing the color, face data by face data, or object by object (roof, wall, etc.),
  changing the height, to reduce the height of buildings or objects that are not relevant in terms of the customization data, or to increase the height of certain objects that are relevant,
  simplifying objects that are not relevant in terms of the customization data, for example by combining contiguous buildings into a single block of houses, by generating triangular surfaces representing a forest rather than individual trees, or by reducing the level of detail of certain objects,
  not displaying textures associated with objects not relevant in terms of the customization data, or using default models in place of certain objects (for example, a tree may be stylized in the form of a ball).

Some of these forms of highlighting may save a significant amount of computing power, and make the application more fluid and clearer for the user. Moreover, since the customization is carried out on the device, the server containing the object data may offer all possible experiences to all users with a single version of the data. Consequently this is also more economical at the server end.

Figure 3:
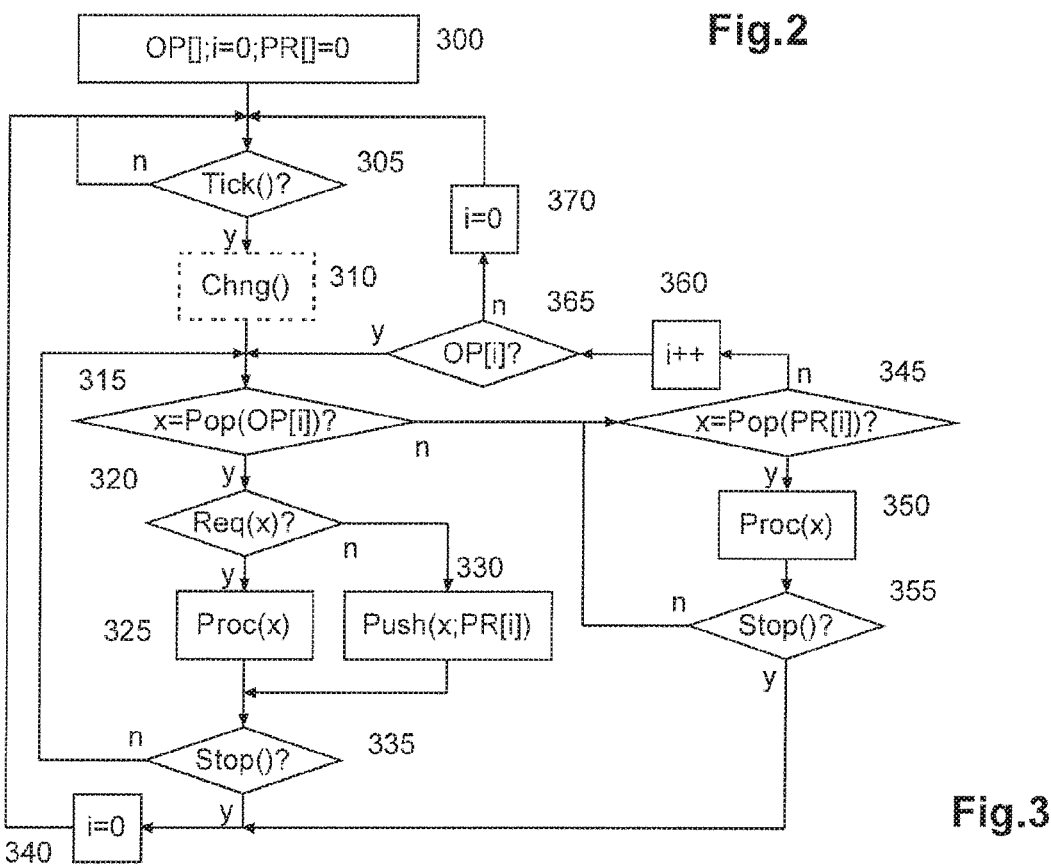
FIG. 3 shows a schematic diagram of an updating operation of FIG. 2.

FIG. 3 shows an example of the execution of operations 220 and 240. In fact, the device of the invention enables a world of unequalled richness to be displayed. As has been mentioned, this richness is partially made possible by the performance of calculations on the device, for example in order to calculate the face data of the objects.

Despite all the improvements offered by the invention, it is clear that, if the device expects to have all the data for displaying the map, both on initialization and during a major change of position, the display delay risks becoming very long, and the user experience will suffer as a result.

This is even more important because Web browsers and other devices incorporating a web interpreter are limited in the number of simultaneous requests that they can send. In fact, they can usually send between 25 and 50 requests for obtaining web page data simultaneously, although this number is not known or standardized.

When this limitation is considered in view of the device described above, it will be readily apparent that, at least in the map initialization phase, the device will rapidly saturate the number of web page data requests, and this saturation will depend on a factor that cannot be controlled. A solution must therefore be found to enable a good user experience to be retained in a complex environment such as that of the device described above, which makes use of very many web resources.

For this purpose, the Applicant has developed the manager of the web interpreter. This manager has the function of selecting the objects to be displayed, modifying them if necessary according to the customization data, and ordering the operations in order to optimize the user experience. In the example described here, a display at 60 images per second is considered optimal, and the manager is optimized accordingly. In other variants, according to other criteria, the manager may be arranged differently.

Thus the manager organizes the operations within the web interpreter. For this purpose, it manages two types of operation, namely data requests and data processing operations. Data requests are all requests for web page data, regardless of whether they concern mapping data or object data or data for updating the code of the 3D engine. As a general rule, these requests may therefore be seen as any exchange between the device and the outside, and may therefore create saturation as explained above.

Conversely, data processing operations concern all the operations internal to the device, such as the triangulation of object data to obtain face data, their arrangement in face block data, the transmission of face block data to the WebGL interpreter for the calculation of the three-dimensional display data, etc.

It should also be understood that data requests and data processing operations are not independent: a data processing operation is directly or indirectly linked to a data request that has been completed.

The device therefore operates by execution cycles. Within a given execution cycle, the manager determines the list of operations "in progress", that is those to be executed, and chooses the operations that are to be executed for this cycle. The downloading of new data is carried out as a priority, since they are data which, when downloaded, are processed so as to be displayed. This becomes more important because, whereas the data processing time is relatively predictable (because it depends on local resources), the downloading time is less predictable (since networks may have an uncontrollable latency).

Theoretically, for a given execution cycle, the manager will prioritize the launch of the newly generated data requests and the data requests not launched in the preceding cycle or cycles. Then, once all possible downloading requests have been launched, the manager allocates time to the operations of processing the received data.

In the example described here, the situation is rather more complex, because the manager will manage a plurality of lists of operations on the basis of their priority, which may also depend on the customization data. For example, an operation relating to a map background tile will take priority over a detail operation. For this purpose, the manager manages a plurality of lists, which it attempts to empty one after another. Thus the manager will initially launch all the data requests on the first list (subject to the limit of the amount possible simultaneously), then all the data processing operations on the first list; then, when this first list is exhausted, it moves on to the second list, and so on.

The manager therefore starts, for a given cycle of an operation 300 based on a table of operations (request or processing) to be executed OP[ ], from an index i of list priority initialized to 0, and a table of processing operations to be executed PR[ ], also initialized to 0.

In an operation 305, a function Tick( ) checks whether a new execution cycle is so close that no new operation can be launched. If this is the case, the operation 305 is repeated until the new cycle commences.

If this is not the case, then, in an optional operation 310, the manager may take external events into account so as to modify its operation with a function Chng( ).

For example, if the user starts to move rapidly in the map, the manager may change the priority lists (for example, it may cease to load the details, prioritizing tile data that were previously on the edge of the image and are becoming central because of the movement), abandon certain operations that are no longer relevant (for example, a request for a tile that will no longer be displayed because of the direction of movement), or modify the cycle time to take into account information input by the user (which may prioritize greater detail or conversely prioritize perfect fluidity, etc.).

Two loops then start, in which the table of operations OP[ ] with the index i will be progressively emptied to launch the execution of the data requests (first loop), before launching the execution of the data processing operations (second loop). In the following text, the terms "table OP[ ] with the index i" and "list OP[i]" will be used interchangeably, the table being simply a way of implementing the various lists of priorities. When these two loops are terminated without the termination of the execution cycle, the operation 305 recommences with the following priority list.

The first loop starts with an operation 315 by popping a current operation x from the list OP[i]. In an operation 320, a function Req( ) determines whether the operation x is a request, and whether or not the maximum number of simultaneous requests has been reached.

If it is a request, and if the number of simultaneous requests has not been reached, then, in an operation 325, a function Proc( ) analyzes the object concerned and determines whether this object corresponds to the customization data. If this is not the case, then the request is deleted and the function Proc( ) terminates. Otherwise, the function Proc( ) launches the execution of the data request. As soon as the downloading of the corresponding data has been executed, the web interpreter modifies the list of operations accordingly, to add a data processing operation relating to the downloaded data.

If it is not a request, or if the number of simultaneous requests has been reached, then, in an operation 330, the manager executes a function Push( ) which analyzes the operation x and, if it is a data processing operation, adds it to the list PR[i] of processing operations to be executed. If it is a request and if the number of simultaneous requests has not been reached, then the function Push( ) moves the operation x into the list of operations to be processed in the next execution cycle.

Finally, after operation 325 or operation 330, a function Stop( ) 335 determines whether or not the manager may still initialize new tasks. If this is not the case, then the index i is reinitialized to 0 in an operation 340, the next execution cycle is awaited with the operation 305. If this is the case, then the first loop resumes with operation 320 to pop the next operation from the priority list with the index i.

When the list of operations with the index i (OP[i]) is empty, the second loop starts. In this second loop, the list PR[i] will be popped to execute processing operations, in a similar way to the first loop, but it is simpler, because, by construction, the list PR[i] contains only processing operations.

Thus, in an operation 345, the list PR[i] is popped, and, in an operation 350, the function Proc( ) is again called to execute the current processing operation x. In the same way as for the operation 325, the function Proc( ) starts by checking whether the processing operation x is still compatible with the customization data. If this is not the case, then the request is deleted and the function Proc( ) terminates. Otherwise, the function Proc( ) launches the execution of the processing operation. The execution of this processing operation may vary according to the customization data.

For example, if the customization data change the height of a building to highlight it, the processing operation will consist in causing the corresponding face data to be calculated, with the height modified according to the customization data. If the customization data indicate that an object must be represented by a ball, then the processing operation will consist in calculating the face data of a ball, adapted according to the dimensions of the object. If the customization data modify the color or transparency of the texture of a face, then the processing operation will include the calculation of the face data with the modification of the texture, etc.

For this purpose, the web interpreter instantiates a web worker, which is a JavaScript component making it possible to benefit from the multicore architecture of modern processors. In a variant, the web interpreter may operate without a web worker, and the function Proc( ) may execute another customization processing operation as described with reference to FIG. 2.

Then, in an operation 355, the function Stop( ) is relaunched in the same way as the operation 335. When the operation 335 indicates an end of an execution cycle, the second loop terminates with the operation 340, then a wait for the next execution cycle with the operation 305. Otherwise, the second loop continues with the operation 345 until the list PR[i] is empty or until the function Stop( ) indicates an end of an execution cycle.

When the list PR[i] is empty, then the manager may move to the next priority list, while incrementing the index i in an operation 360, and checking whether the list with the index i exists in an operation 365. If this is the case, then the execution cycle continues with the first operation 320 of the first loop of the new priority list. Otherwise, the index i is reinitialized to 0 in an operation 370, and the next execution cycle is awaited with the operation 305.

The operating mode described in FIG. 3 is particularly useful, because it allows the lists of operations to be kept constantly updated from one execution cycle to another. When a new operation is introduced, the web interpreter transmits it to the manager which receives it in one of the prioritization lists and executes it as rapidly as possible.

Additionally, this operation provides a display as rapidly as possible: the display engine does not wait until all the data have arrived before starting to display the map. Due to the nature of prioritization, the most important data will be received first and displayed as soon as possible. Thus the world is constructed as the user watches.

For example, for use in the real estate field:
List 0 (maximum priority): the locations of the real estate properties, because it is more important for the user to see that there are properties corresponding to his search criteria somewhere on the map than to be able to find the location,
List 1: the map background, because it enables the user to find the location,
List 2: the information defining the relief of the terrain and the buildings,
List 3: the trees, fountains, vineyards, cemeteries, etc.

In a variant, there may be only a single prioritization list. As mentioned above, the priority of some elements and/or their inclusion in the prioritization lists may depend on their nature. For example, objects of the "details" type may not be displayed when the zoom indicates an excessively long distance. Thus, in the example described here, details which are long way off on the horizon, and therefore very small, are not requested by the client. Each type of detail is associated with a maximum distance, which does not depend on its size alone. For example, pylons on the horizon are never requested, but forests always are.

Similarly, the function Chng( ) may take into account the fact that the user is in the process of moving the camera to adapt the priorities. Some examples of processing operations that may be managed by the function Chng( ) are given below.

After each movement or zoom requested by the user, the web interpreter sorts the requests in order to prioritize the processing of the operations according to the one closest to the center of the screen, because this is the location that the user is facing.

When the user shifts the map, the priority of the request operations may change:
some operations may be disabled, for example by not having the lists of lower priority processed by the manager (in the example of real estate described above, only these); for example, only the locations of the real estate properties (List 0) are requested, and the map background (List 1) if possible,
the manager requests tiles from the server with a lower level of detail (and therefore with a more summary content) than the level that it would request when the map is static, but for use at the larger size: this enables loading to be carried out more rapidly and therefore increases fluidity, and even if the displayed map is less precise and therefore less clear, the movement will mean that the user does not notice this,
requests for tiles for which no data have yet been received will have their priority increased relative to the tiles for which the data are already available but with a level of detail below the requested level,
any operation relating to anything that is no longer visible to the user is cancelled, and therefore eliminated from the prioritization list.

Additionally, a displayed tile will be kept in the cache until the center of the map is at a chosen distance from this tile (for example, 10 km).

The priority of the processing operations may also change:
when the map shifts, the manager reduces the time allowed for the generation of the details and the buildings, which will thus appear later without causing jerks in the movement,
if the manager determines that the device is not powerful enough to execute all the processing operations, some objects may be selectively disabled, such as the decoration objects (the texture and animation of the water in watercourses, etc.), on the basis of the customization data,
the processing of the data in the face data block may be prioritized relative to the processing of the texture data in order to send them to the hardware resources for calculation.

In the above description, the invention has been described in its most complete form, that is to say with the use of the Buffer32, customization and ordering of operations. However, the use of the customization data only would make it possible to implement the invention on simpler devices, for example by not implementing the Buffer32 or the ordering of the operations.

In fact, in a conventional device, it would be impossible to display all the objects while still providing a sufficiently fluid and detailed display. On the other hand, the invention, by selecting a restricted and optimized set of objects to be displayed according to the customization data, makes it possible to obtain satisfactory results while offering the optimal range of display to all the users, since the customization is carried out on the device, not on the server.

At the same time, the invention also makes it possible to use the customization data in an optimal way to benefit from the application when the device is of the type described above.

Other variants may be apparent from a perusal of the following claims.

The invention claimed is:

1. An interactive device, comprising:
a user interface to define at least one display request comprising at least localization data and display data,
a network interface to transmit a web page data request in correspondence with the at least one display request,
a memory for receiving web page data and customization data corresponding to the web page data request, the web page data comprising at least one of mapping data and object data, and
a web interpreter to display a web page, the web interpreter comprising a three-dimensional (3D) engine, a display engine, and a manager, wherein
the 3D engine calculates 3D display data based on the object data,
the display engine displays the web page data based on at least one of the mapping data and the 3D display data, and
the manager
operates to determine an execution list comprising at least one operation indicative of a request for at least one of the object data and the mapping data, or a processing request by the 3D engine or the display engine for displaying received data, and modifies certain operations on the execution list based on the customization data defined by the user interface,
modifies certain processing operations by the 3D engine on the execution list by modifying the downloaded object data based on the customization data, modifies certain object data request operations or processing operations by the 3D engine on the execution list by removing them based on the customization data, executes the object data request operations according to their order in the execution list, executes the data request operations before the processing operations, and determines, between the execution of two operations, whether a time interval between a current time and a time of a next execution cycle is greater than a threshold time value, and ceases to move down the execution list of operations.

2. The device as claimed in claim 1, wherein the modification of the object data comprises modifying one of height data, at least one of color and texture transparency data, data defining a shape of an object and fusion with other object data.

3. A non-transitory, computer readable medium having computer readable instructions stored thereon, which when executed by a processor, causes the processor to perform the steps comprising:

defining at least one display request comprising at least localization data and display data, transmitting a web page data request in correspondence with the at least one display request, receiving web page data and customization data corresponding to the web page data request, the web page data comprising at least one of mapping data and object data, and displaying a web page by calculating three-dimensional (3D) display data based on the object data, displaying the web page data based on at least one of the mapping data and the 3D display data, determining an execution list comprising at least one operation indicative of a request for at least one of the object data and the mapping data, or a processing request for displaying received data, modifying certain operations on the execution list based on the customization data, modifying certain processing operations by the 3D engine on the execution list by modifying the downloaded object data based on the customization data, modifying certain object data request operations or processing operations by the 3D engine on the execution list by removing them based on the customization data, executing the object data request operations according to their order in the execution list, executing the data request operations before the processing operations, and determining, between the execution of two operations, whether a time interval between a current time and a time of a next execution cycle is greater than a threshold time value, and ceasing to move down the execution list of operations.

4. A system comprising:

a server; and a processor in communication with the server, the processor:

defining at least one display request comprising at least localization data and display data, transmitting a web page data request in correspondence with the at least one display request to the server, receiving, from the server, web page data and customization data corresponding to the web page data request, the web page data comprising at least one of mapping data and object data, and displaying a web page by calculating three-dimensional (3D) display data based on the object data, displaying the web page data based on at least one of the mapping data and the 3D display data, determining an execution list comprising at least one operation indicative of a request for at least one of the object data and the mapping data, or a processing request for displaying received data, modifying certain operations on the execution list based on the customization data, modifying certain processing operations by the 3D engine on the execution list by modifying the downloaded object data based on the customization data, modifying certain object data request operations or processing operations by the 3D engine on the execution list by removing them based on the customization data, executing the object data request operations according to their order in the execution list, executing the data request operations before the processing operations, and determining, between the execution of two operations, whether a time interval between a current time and a time of a next execution cycle is greater than a threshold time value, and ceasing to move down the execution list of operations.

5. The non-transitory, computer readable medium of claim 3, wherein the modification of the object data comprises modifying one of height data, at least one of color and texture transparency data, data defining a shape of an object and fusion with other object data.

6. The system of claim 4, wherein the modification of the object data comprises modifying one of height data, at least one of color and texture transparency data, data defining a shape of an object and fusion with other object data.

* * * * *